Jan. 17, 1950     T. E. BROWNE, JR     2,495,157
ELECTROMAGNETIC DEVICE

Filed Aug. 17, 1948

WITNESSES:
E. G. M'Closkey
E. F. Oberlein

INVENTOR
Thomas E. Browne, Jr.
BY
Paul E. Friedmann
ATTORNEY

Patented Jan. 17, 1950

2,495,157

UNITED STATES PATENT OFFICE 2,495,157

ELECTROMAGNETIC DEVICE

Thomas E. Browne, Jr., Pittsburgh, Pa., assignor to Westinghouse Electric Corporation, East Pittsburgh, Pa., a corporation of Pennsylvania Application August 17, 1948, Serial No. 44,621

1 Claim. (Cl. 171—119)

This invention relates generally to electromagnetic devices, and more particularly to electromagnetic devices useful in the measurement of mechanical motions.

Various types of devices are employed in the measurement of large mechanical motions. Most frequently employed among these devices is the slide-wire resistance. However, this type of device is generally not satisfactory due to the difficulties encountered with the sliding electrical contacts which must be used. Among electromagnetic devices which have been used for measuring large motions, the problem of non-linearity has always caused considerable difficulty in measuring the mechanical motion, and it is to a solution of this problem that this invention is directed.

Generally, it is an object of this invention to provide an electromagnetic motion indicator which is simple in its elements and positive in operation.

Another object of this invention is to provide an electromagnetic indicator which is linearly responsive to the applied physical quantity.

A further object of this invention is to provide an electromagnetic indicator which is useful in the measurement of large mechanical motions.

The foregoing statements are merely illustrative of the various aims and objects of this invention. Other objects and advantages will become apparent upon a study of the following disclosure when considered in conjunction with the accompanying drawings, in which:

Figure 1 schematically illustrates an electromagnetic indicator of the class described which embodies the principles of this invention;

Figure 1:
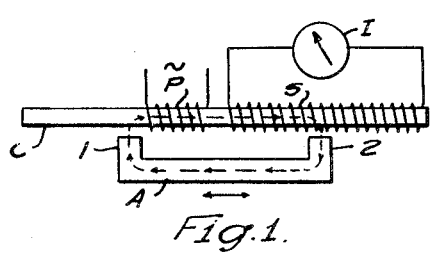
Figure 6:
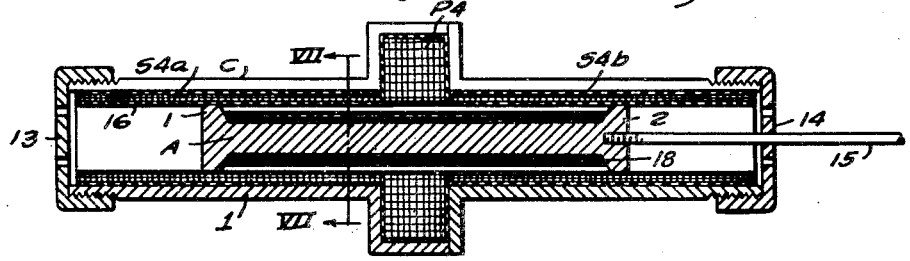
Fig. 6 is a detailed drawing showing in longitudinal cross section a preferred embodiment of the invention.

The electromagnetic motion or travel indicator of this invention employs variable ratio transformer elements. The basic principle is illustrated by the schematic diagram of Fig. 1. In Fig. 1 the assembly includes a pair of relatively movable magnetic members, one of which may be termed a core C and the other of which may be termed an armature A or plunger. The core and armature are relatively movable longitudinally but are fixed against lateral displacement. The manner in which this may be accomplished is illustrated in Fig. 6 and will be hereinafter described in detail. The armature A includes a pair of lateral projections 1 and 2 at the extremities thereof which confront the side of the core C and are arranged in predetermined spaced relation therewith to form airgaps of constant magnetic characteristic whether the armature is stationary or being moved by a motion which is to be measured. The core C is provided with a winding P thereabout and a secondary winding S. Upon the application of an alternating current to the primary winding, a magnetic flux is caused to flow in the magnetic circuit formed by the core and the armature which for an instantaneous condition will flow in the direction indicated by the dotted arrows. The voltage induced in the secondary winding depends upon the amount of the secondary winding which is linked by the magnetic circuit and this depends upon the position of the armature with respect to the secondary winding.

With a fixed alternating voltage applied to the primary winding P, movement of the plunger parallel to the core changes the number of secondary turns linking the fixed amplitude alternating flux maintained in the magnetic circuit by the primary coil, thus changing the alternating voltage generated in the secondary coil and measured by the indicator I which may be a voltmeter. If the secondary winding is uniformly distributed along the core, the voltmeter reading will thus be proportional to the length of the secondary winding included between the poles or projections 1 and 2 of the plunger or armature, or, in other words, will give a linearly-varying indication of the relative position of the plunger. When built in this way, the electromagnetic travel indicator is analogous to the usual slide-wire resistance potentiometer retaining its inherent linearity and having stepless variation, but dispensing with its sliding contact. Also, as will be evident from the discussion of Fig. 6 which appears hereinafter, it can be more readily shielded against stray magnetic fields than the slide-wire device.

Figure 2:
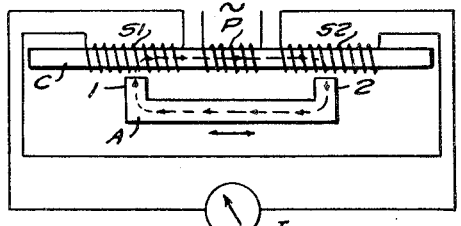
Fig. 2 is a modification of the invention illustrated in Fig. 1 and embodies a symmetrical distribution of the magnetic circuit tending to improve operation of the device.

Further modifications of this simple arrangement can be made to achieve various additional advantages. For example, Fig. 2 shows a balanced double secondary winding arrangement in which the effect of leakage flux affecting the basic linearity of response of the electromagnetic devices is largely eliminated. In this embodiment of the invention, an additional secondary winding is placed on the opposite side of the primary winding P. The two secondary windings are now designated S1 and S2, and each winding is straddled in an amount depending upon the position of the armature A or the plunger with respect to the core assembly. With this arrangement, the two secondary windings may be connected in series opposition with a suitable indicating instrument I connected in series in the circuit to respond to the unbalanced voltage or current between the secondary windings. Thus, it will be appreciated that motion of the plunger, for instance to the left as viewed in Fig. 2, will increase the voltage of the secondary winding S1 while at the same time decreasing the voltage of the secondary winding S2, since more of the turns of the secondary winding S1 and less of the turns of the secondary winding S2 are being linked by the magnetic circuit. The indicator I will, therefore, exhibit the motion of the plunger or armature A. In view of the similarity of airgap constructions adjacent both ends of the projections or poles 1 and 2 of the armature A, the leakage characteristic of these airgaps will be substantially the same, and as a result, linearity errors normally present because of leakage flux are largely eliminated. Similarly, response of the instrument to ambient temperature and other factors influencing linearity is largely eliminated in the electrically symmetrical construction.

Figure 3:
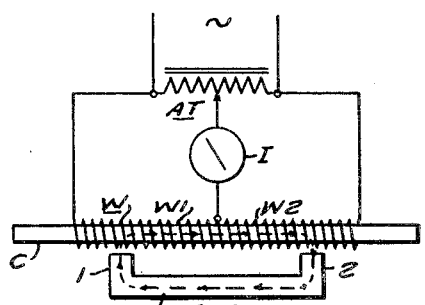
Fig. 3 is a variation of the invention illustrated in Fig. 2.

In the modification of the invention illustrated in Fig. 3 the separate primary winding P is eliminated and an autotransformer type of connection is used requiring only a three-wire connection to the coil of the indicator. The indicator now includes a single, uniformly-distributed winding W which is split into two sections by the center tap thereof. These sections are designated W1 and W2, respectively to the left and right of the center tap. An autotransformer AT provided with a variable tap is connected across the extremities of the winding W and also connected to a suitable source of alternating current. An indicating instrument I is connected between the tap on the winding W and the movable tap on the autotransformer AT. This in effect, forms an electrical bridge circuit in which the indicating instrument is connected across the output terminals, and the bridge circuit is conveniently electrically balanced by adjustment of the slidable tap along the autotransformer. The advantages of the symmetrical construction of Fig. 2 are inherent also in this device, again due to the fact that a symmetrical winding distribution is obtained. Alternatively, the zero indication position of the plunger can be arbitrarily shifted by moving the slider of the auxiliary adjustable autotransformer shown. This is a circuit commonly employed with electromagnetic strain gauges.

Figure 4:
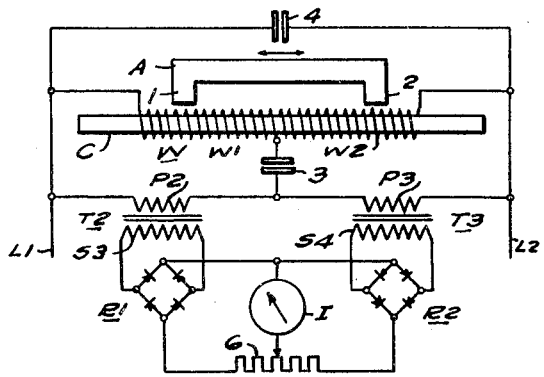
Figs. 4 and 5 illustrate applications of the invention in connection with suitable types of metering circuits.

Other circuits used and usable with the strain gauge can also be used as well with this indicator. For example, the circuit of Fig. 4 is particularly suitable for use with a center-zero type D. C. ammeter as an indicator. Alternatively, a magnetic oscillograph element can also be used instead of the ammeter indicated in Fig. 4. The electromagnetic motion indicator of Fig. 4 again includes the autotransformer type of connection illustrated in Fig. 3, and to this end is provided with a winding W including the two taped sections W1 and W2. The metering circuit includes a pair of full-wave rectifiers R1 and R2 having their outputs connected in series circuit relationship, the series circuit including a potentiometer 6. A D. C. ammeter indicated again by the reference character I is connected across this circuit to a tap on the potentiometer 6. Adjustment of the tap along the potentiometer is used for obtaining the desired zero setting of the instrument. This may be the true zero or any off-center setting which is desired. Each of the rectifiers R1 and R2 are supplied respectively by secondary windings S3 and S4 of transformers T2 and T3, respectively. The primary windings P2 and P3 of these transformers are arranged as adjacent legs of a bridge circuit in which the winding sections W1 and W2 of the indicator form the remaining adjacent legs. The center tap of the winding W is connected between the primary windings P2 and P3 to complete this circuit. As indicated, this circuit includes a capacitor 3. However, a straight-wire connection may be used.

In operation, movement of the armature A, for example to the left as viewed in Fig. 4, increases the voltage of winding W1 while decreasing that of the winding W2, to correspondingly unbalance the voltages appearing across the primary windings P2 and P3. As a consequence, the voltage applied to the full-wave rectifier R1 increases while that applied to full-wave rectifier R2 decreases, producing a voltage unbalance therebetween, and as a result a current flow through the instrument I is obtained. This current flow, it will be appreciated, is linearly proportional to the motion of the armature or plunger A. The use of the two full-wave rectifiers and their connection to separate power supplies obtained in the transformers T2 and T3 makes possible the use of a minimum base current for exciting the rectifiers, as described in U. S. Patent 2,434,547, granted January 13, 1948, and assigned to the same assignee as this invention. The use of a minimum base current affords operation along the linear portion of the characteristic curve of the rectifiers, thus obviating the possibility of instrument errors due to instrument circuit non-linearity. The efficiency of this circuit can be improved by inclusion of the parallel and series condensers 4 and 3, respectively. It is not to be construed, however, that the circuit is inoperative without these condensers.

Figure 5:
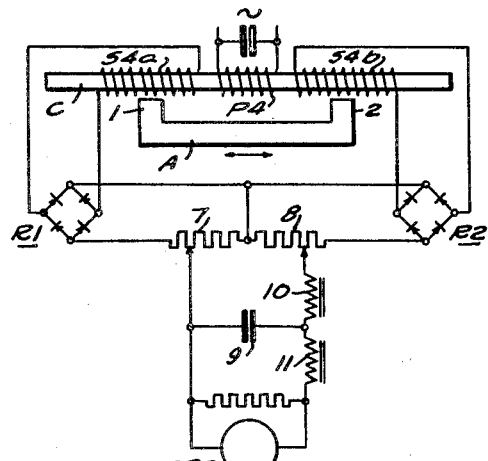

Another balanced circuit suitable for a high impedance type of indicator such as a D. C. voltmeter or the cathode ray oscilloscope shown is illustrated in Fig. 5. In this embodiment of the invention, the indicator is provided with a primary winding P4 similar to that designated P in Fig. 2. The two secondary windings are designated S4a and S4b. Each of the secondary windings supply a full-wave rectifier winding S4a being connected to rectifier R1 and winding S4b being connected to rectifier R2. The outputs of the rectifiers R1 and R2 are connected in opposition, one side of the circuit including the resistors 7 and 8 and a common circuit branch is connected between resistors 7 and 8 and to the positive sides of the rectifiers. Thus, it will be appreciated that opposed direct-current voltages are applied across each of the resistors 7 and 8. Tapped portions of these voltages are applied across the cathode-ray oscilloscope through the filter network including the coils 10 and 11 and the capacitor 9. This is a conventional low-pass filter for the elimination of the rectifier ripple and is included ahead of the oscilloscope.

Figure 8:
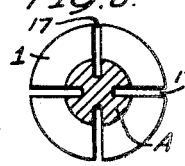
Figs. 8 and 9 are variations in plunger construction, each appearing in cross section.

One practical form which the indicator may take is indicated in Fig. 6. In this illustration, the core C is of the form of a tube of magnetic material which is slit longitudinally to form an incomplete annulus in cross-section. This tube is formed in two sections, and the confronting extremities of the tube sections are flanged outwardly to house the primary winding P4. The secondary windings S4a and S4b are insulatedly supported internally of the core C in coaxial positions on opposite sides of the primary winding P4. Internally of the windings S4a and S4b is an insulating tube 16 in which the circular flanges 1 and 2 constituting the poles of the armature or plunger A may slide. The ends of the core or the housing C are enclosed by caps which thread over the extremities of the housing. These caps are designated 13 and 14 and are preferably formed of non-magnetic material. Suitable vent holes are provided in both of the caps to provide for the passage of air to and from the cylinder as the plunger is moved. The plunger may be actuated by a suitable bar 15 of non-magnetic material which threads into the right-hand end of the plunger as viewed and passes through a center hole in the cap 14. As illustrated in the section of Fig. 6 only the lower portion of the housing is cross-hatched, the plane of the longitudinal section passing through the split section of the housing C. That is, the housing C is provided with a longitudinal slit extending along its entire length. This is for the purpose of preventing excessive eddy currents in the housing due to the main flux. Additionally, it is advisable that the plunger shall also be slit longitudinally. The manner in which this may be accomplished is indicated in Fig. 8 wherein radial slots 17 extend through the flanged portions 1 and 2 of the plunger into the main body of the plunger.

Another and probably better method of minimizing the effects of eddy currents in the plunger and the magnetic housing rather than slitting these members or constructing them of laminations as in conventional practice, is to make all of the magnetic parts of bonded powdered iron, especially for the higher frequency voltages which are sometimes required, that is, frequencies of the order of 10,000 cycles per second. This is desirable for many practical applications.

Figure 7:
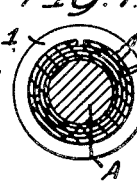
Fig. 7 is a sectional view taken on line VII—VII of Fig. 6, but showing only the plunger of this invention.
Figure 9:
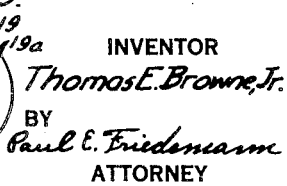

Flux shielding of the armature as illustrated in Figs. 6 and 7 may be accomplished by providing several insulated layers of conducting material around the body portion of the armature between the flanges. As illustrated in Fig. 7, each of these layers of conducting material designated 18 is insulated spaced from adjacent layers by insulation 18a and is longitudinally slit to provide a discontinuous circumferential surface. An alternative method of shielding is illustrated in Fig. 9 wherein a single insulated sheet 19 of aluminum foil or copper or other suitable material is continuously wound about the body portion of the plunger, the insulating material 19a being disposed between adjacent turns. It will be appreciated that stray flux lines tending to flow transversely of the layers of conducting material about the plunger produce eddy currents therein, according to accepted theory, producing counter magnetomotive forces with respect to the stray flux. This in effect results in a high reluctance flux path tending to confine flux flow to the plunger and additionally minimizes the tendency of stray flux to link the plunger. With the flux path shielded and restricted by the specially shaped plunger a linear relation between plunger position and the number of secondary turns included in the magnetic circuit and, hence, between plunger position and the voltages generated in the secondary coils, is obtained, not only for a short motion but also for extended motions within the mechanical limits of movement of the parts.

If the autotransformer type of connection is used in place of the transformer type illustrated in Fig. 6, the primary winding P4 would be eliminated and three leads brought from the main winding disposed within the housing C.

While the preferred embodiments of this invention have been illustrated in the drawings and discussed in the descriptive disclosures, it will be appreciated that other variations of this invention may be made without departing from the spirit and scope hereof. Accordingly, it is intended that the foregoing description and illustrative showings made in the drawings shall not be considered in a limiting sense.

I claim as my invention:

An electromagnetic device comprising, in combination, a housing of magnetic material of the form of an incomplete annulus, uniformly axially distributed annular coil means disposed within said housing, a plunger of magnetic material of shorter axial length than said housing and said coil means concentrically arranged within said coil means and having circular flanges at the extremities thereof, a non-magnetic tube disposed between said coil means and said plunger, the flanges of said plunger slidably engaging said tube for supporting said annular housing and said plunger for relative longitudinal movement in fixed radial relationship, means for supplying excitation to axially spaced portions of said coil means, and at least one split sleeve of non-magnetic electrical conducting material surrounding said plunger intermediate said circular flanges.

THOMAS E. BROWNE, Jr.

REFERENCES CITED

The following references are of record in the file of this patent:

UNITED STATES PATENTS

| Number | Name | Date |
| --- | --- | --- |
| 788,278 | Porter | Apr. 25, 1905 |
| 1,210,705 | Schuehardt | Jan. 2, 1917 |
| 1,656,381 | Marvel | Jan. 17, 1928 |
| 1,725,554 | Winton | Aug. 20, 1929 |
| 2,436,639 | Faus | Feb. 24, 1948 |
| 2,452,862 | Neff | Nov. 2, 1948 |